Oct. 1, 1963 M. B. CONRAD Re. 25,453

GAS PRESSURE OPERATED WELL APPARATUS

Original Filed Sept. 20, 1948 2 Sheets-Sheet 1

MARTIN B. CONRAD,
INVENTOR.

BY

Mellin and Hanscom

ATTORNEYS

Oct. 1, 1963 M. B. CONRAD Re. 25,453

GAS PRESSURE OPERATED WELL APPARATUS

Original Filed Sept. 20, 1948

2 Sheets-Sheet 2

MARTIN B. CONRAD,
INVENTOR.

BY

Mellin and Hanscom

ATTORNEYS

United States Patent Office

Re. 25,453
Reissued Oct. 1, 1963

25,453

GAS PRESSURE OPERATED WELL APPARATUS

Martin B. Conrad, Downey, Calif., assignor to Baker Oil Tools, Inc., Vernon, Calif., a corporation of California Original No. 2,618,343, dated Nov. 18, 1952, Ser. No. 50,084, Sept. 20, 1948. Application for reissue Sept. 13, 1962, Ser. No. 223,570
9 Claims. (Cl. 166—63)

Figure 1A:
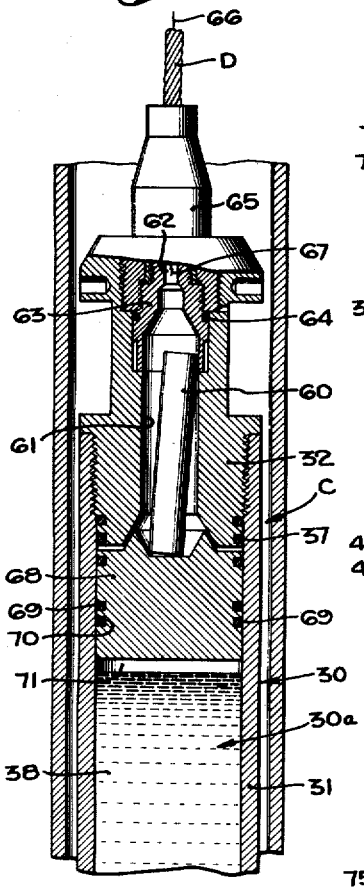

Matter enclosed in heavy brackets [ ] appears in the original patent but forms no part of this reissue specification; matter printed in italics indicates the additions made by reissue.

The present invention relates to well apparatus, and more particularly to sub-surface equipment useful in performing operations in oil, gas and similar well bores.

Gas under pressure, such as air, hydrogen, acetylene, products of combustion, and the like, have been proposed for use in operating sub-surface well equipment. Certain of such equipment is best operated if the expansion of the gas is controlled or retarded to enable operational sequences of the equipment to occur in a predetermined order, rather than all substantially simultaneously.

Accordingly, an object of the present invention is to prevent rapid expansion of the motivating gaseous medium as its pressure increases, in order to insure proper operation of the sub-surface well equipment.

Another object of the invention is to provide sub-surface well equipment operable by a motivating gaseous medium, in which the increasing force of the gaseous medium, as its pressure increases, is delayed in its action on the equipment, to allow sufficient time for the operational sequences on the equipment to occur in a predetermined order.

The motivating gaseous medium not only operates the well equipment, but may also effect release of the equipment, or part of it, from the well bore to enable its withdrawal to the surface. Heretofore, release of all or a portion of the equipment has permitted the gaseous medium to expand suddenly, which imposed severe shock loads on the apparatus and at times inflicted damage upon some of its parts.

Accordingly, a further object of the invention is to prevent damage to fluid or gas operated sub-surface equipment upon release of the load imposed upon it.

Yet another object of the invention is to provide improved gas operated sub-surface well apparatus, in which sudden expansion of the gaseous motivating medium is prevented, upon release of a large portion of the load on the apparatus.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Figure 1B:
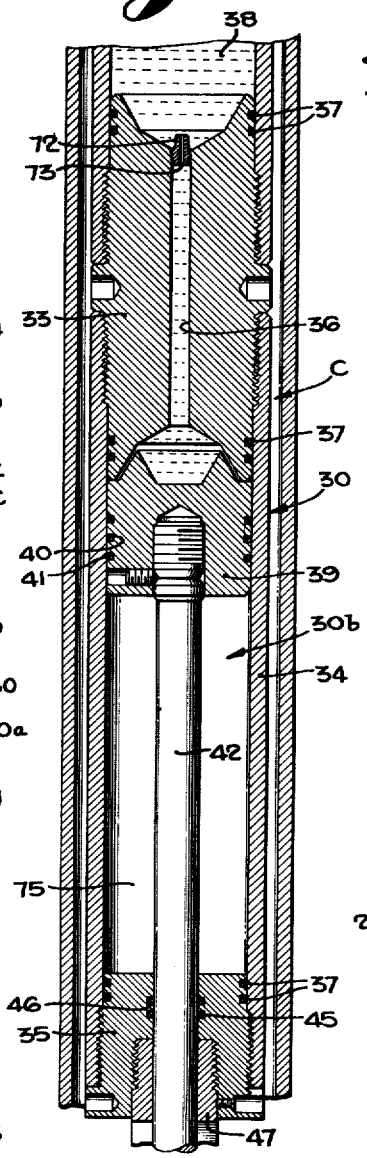
Figure 1C:
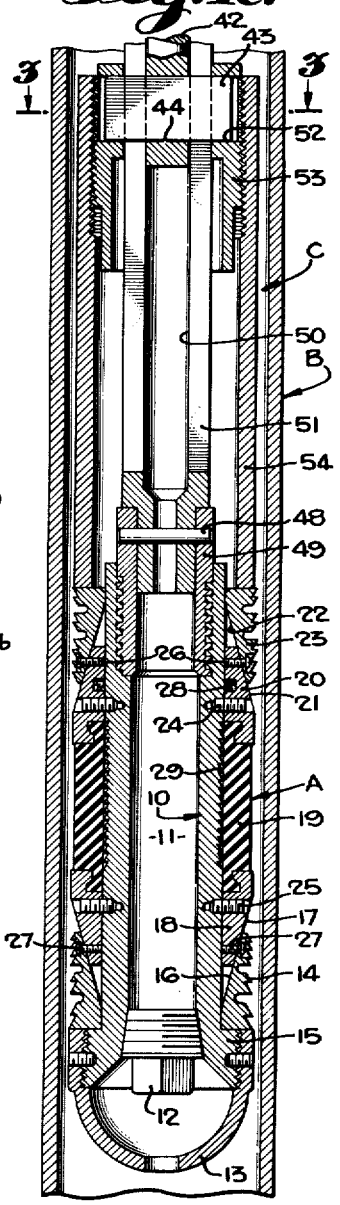
Figure 3:
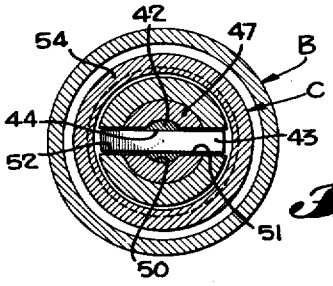
Figure 2A:
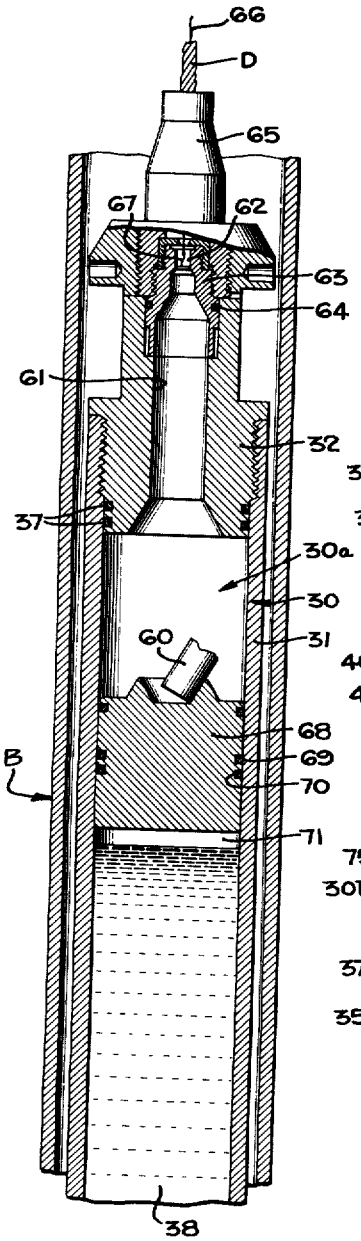
Figure 2B:
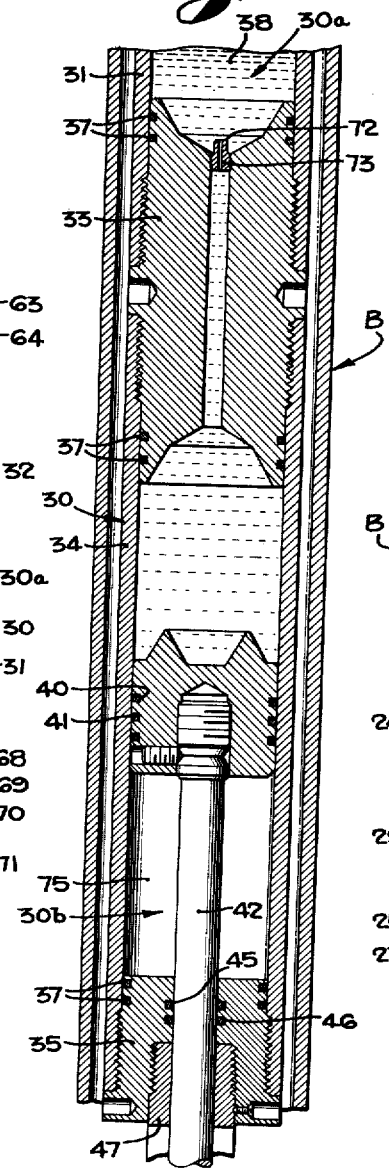
Figure 2C:
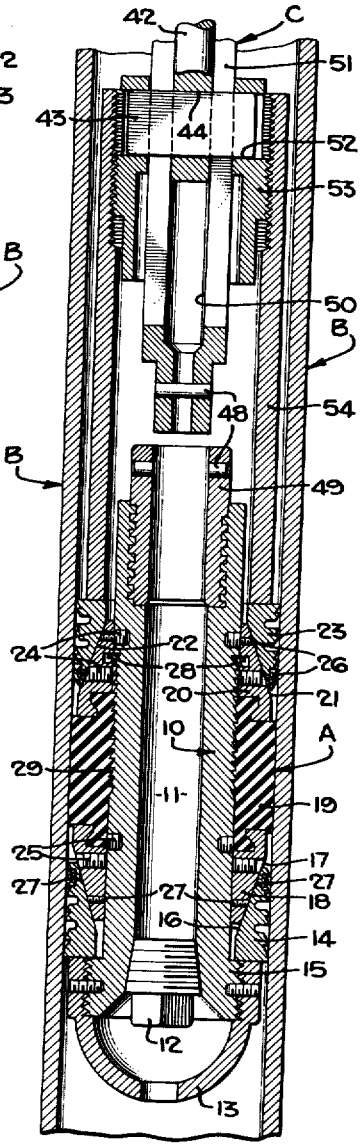

Referring to the drawings:

FIGURES 1a, 1b, and 1c together constitute a longitudinal section through well apparatus positioned in a well casing, with the parts occupying their initial position for lowering the apparatus through the casing, FIG. 1c forming a lower continuation of FIG. 1b and the latter forming a lower continuation of FIG. 1a;

FIGS. 2a, 2b and 2c are views similar to FIGS. 1a, 1b and 1c, with part of the apparatus secured in a well casing, and another part released from the first part for withdrawal from the well casing; and FIG. 3 is a cross-section taken along the line 3—3 on FIG. 1c.

In the form of the invention disclosed in the drawings, it is desired to run a well packer A to a desired location in a well casing B disposed within a bore hole. The packer is then anchored in packed-off condition against the well casing through use of a setting tool C connected to it. This setting tool is attached to the lower end of a runing-in string, such as a wire line D, extending to the top of the well bore.

The well packer A may assume any desired form. The one disclosed in the drawings includes a tubular main body 10 whose central passage 11 may be closed by a plug 12. A guide 13 is secured to the lower end of the body, to prevent hanging up of the tool in the casing bore or coupling spaces during its lowering in the well casing B.

The well packer can be anchored against downward movement in the well casing by a plurality of lower segmental slips 14 engaging the guide 13 and the lower abutment or flange 15 on the body. The inner surfaces 16 of these slips are tapered in a downward and inward direction for slidable engagement with a corresponding, or externally tapered, surface 17 on a frusto-conical expander 18 slidable on the body. This expander is connected to the lower end of a packing sleeve 19, of rubber or similar material, disposed around the body 10, the upper end of this packing sleeve being connected to an upper expander 20 having an upwardly and inwardly inclined externally tapering surface 21 engageable with correponding tapered surfaces 22 on a plurality of upper segmental slips 23.

Initially, the slips 14, 23 and packing element 19 are retained in retracted positions with respect to the packing body 10. Shear screws 24, 25, or other suitable frangible connecting elements, secure the upper and lower conical expanders 20, 18 to the body, with the intervening packing sleeve 19 held in retracted position. The upper and lower slips 23, 14 are also held in retracted positions by shear screws 26, 27, attaching them to their associated upper and lower expanders 20, 18.

The shear screws 26 attaching the upper slips 23 to the upper expander 20 have a combined shearing strength which is substantially less than the shear value of the screws 24 holding the upper expander to the body 10. These latter screws have a lesser shear value than the screws 25, 27 securing the lower expander 18 to the body, and the lower slips 14 to the lower expander. These relative shear values are selected to secure detachment, at first, of the upper slips 23 from the upper expander 20, and the movement of the upper slips downwardly along the upper expander and radially outward into anchoring engagement with the casing wall. A subsequent upward strain or pull on the packer body 10 then shears the screws 24 holding the upper expander 20 to the body 10 and moves the lower expander 18 and slips 14 with the body toward the upper expander 20 and slips 23, in order to effect compression of the packing 19 between the expanders and its outward expansion into firm sealing engagement with the wall of the casing.

Thereafter, an increase in the upward pull or force on the packer body 10 substantially simultaneously shears the screws 25, 27 holding the lower expander 18 to the body, and the lower slips 14 to the lower expander, to cause the lower flange 15 and guide 13 on the body to shift the lower slips 14 upwardly along the lower expander and radially outward into anchoring engagement with the wall of the casing B. A split retractor ring 28 may be disposed in the expander 20 for engagement with one of several buttress thread ratchet teeth 29 formed on the exterior of the body 10, to lock the latter against downward movement (see FIG. 2c).

In the form of invention disclosed in the drawings, setting of the well packer A is dependent upon the development of a gas pressure within a setting tool C secured initially to the well packer. This gas pressure is developed within the upper portion of a cylinder 30 consisting of a generally cylindrical upper sleeve 31, an upper head 32 threaded into the sleeve, and also an intermediate head 33 threaded into the sleeve. A lower cylinder sleeve 34 is threadedly secured on the intermediate head 33, and is, in turn, threaded onto a lower cylinder head 35.

The upper head 32, upper sleeve 31 and intermediate head 33 form an upper cylinder portion 30a, whereas the intermediate head 33, lower cylinder sleeve 34 and lower head 35 form a lower cylinder portion 30b. These two cylinder portions 30a, 30b are separated by the intermediate head 33, but are communicable with each other through a central passage 36 formed through the intermediate head. Leakage from the cylinder through the several threaded connections may be prevented by suitable side seals 37 in the heads 32, 33, 35 engaging the inner walls of the cylinder sleeves 31, 34.

A motivating gas under pressure is generated in the upper cylinder portion 30a, and this force is transmitted through a suitable fluid medium 38 to the lower cylinder portion 30b through the intermediate head passage 36, for operation upon a piston 39 slidably mounted in the lower cylinder portion. This piston 39 has one or more ring grooves 40 in its periphery for the accommodation of seal rings 41, to prevent leakage between the piston 39 and lower cylinder sleeve 31. As disclosed, these rings 41 may consist of rubber, round in cross-section, to guard against leakage in both directions.

The upper end of a piston rod 42 is threadedly connected to the piston 39, the rod extending downwardly through the lower cylinder head 35 to a point therebelow, where an anvil or cross piece 43 is mounted within a transverse slot 44 in the rod. Leakage between the rod 42 and lower cylinder head 35 is prevented by suitable rod packing 45, in the form of one or more round rubber or rubber-like seals engaging the periphery of the rod 42 and disposed within suitable ring grooves 46 in the head 36. The packing or seal rings 45 prevent leakage of liquids from the well casing into the cylinder 30b below the piston 39, insuring that air under atmospheric pressure is present below the piston when the apparatus is assembled and lowered in the well casing B.

It is desired to transfer the downward movement of, or force imposed upon, the piston 39 and the piston rod 42 to the upper slips 23 of the packer A, and the relative upward movement of the cylinder 30 to the packer body 10, in order to obtain the desired anchoring of the packer in the well casing. To accomplish this purpose, a tubular actuating mandrel 47 is threadedly connected to the lower end of the lower cylinder head 35. The lower end of the mandrel 47 is secured, through the agency of a frangible connecting pin 48, to a sleeve 49 threaded into the upper end of the body 10. As specifically disclosed, the lower end of the mandrel 47 is of reduced diameter and is piloted within the sleeve 49, the pin 48 extending transversely through the sleeve and piloted mandrel portion.

The piston rod 42 is movable downwardly within the bore 50 of the actuating mandrel 47, the cross-piece 43 projecting in opposite directions from the rod through diametrically opposed longitudinally extending slots 51 formed through the mandrel wall. The cross-piece also extends into opposed slots 52 formed through a setting ring or sleeve 53 slidably mounted on the actuating mandrel 47, to form a connection between the piston rod 42 and the setting ring 53. A setting sleeve or skirt 54 is adjustably threaded on the setting ring 53, its lower end engaging the tops of the upper slips 23.

As indicated above, a force or pressure is imposed upon a liquid 38, such as water, resting on top of the piston 39. This force moves the piston 39 and piston rod 42 downwardly and the cylinder 30 in a relative upward direction. The downward movement of the rod 42 is transmitted to the setting sleeve or skirt 54 through the anvil 43 and setting ring 53; whereas the upward movement of the cylinder 30 is transmitted to the packer body 10 through the actuating mandrel 47, frangible pin 48, and sleeve 49. Accordingly, it is apparent that the development of sufficient pressure in the cylinder 30 acting upon the piston 39 will eventually shear the screws 26 holding the upper slips 23 to the expander 20, and move the slips outwardly against the casing B. Thereafter, the cylinder 30 will move upwardly to pull the body 10 in the same direction for the purpose of expanding the packing sleeve 19 against the casing B, and the lower slips 14 against the casing, in the manner described above.

In order to obtain the desired operational sequence, a combustible fuel 60 may be contained within the upper end of the cylinder 30. The combustion charge, such as a railway flare of cylindrical or stick form, is placed in the upper head end 32 of the cylinder within a combustion chamber 61 formed therein. This charge 60 is ignited by a blank cartridge 62 contained within a gun barrel 63 inserted within the upper end of the upper cylinder head 32. Leakage between the barrel and head is prevented by a suitable side seal 64 on the barrel engaging the wall of the head.

The barrel 63 is threaded into a firing head 65, which, in turn, is threadedly secured to the upper end of the cylinder head 32. The wire line running-in string D is suitably secured to the firing head, in a known manner, and has the lower end of its electrically conductive wire or core 66 connected electrically to a heating filament 67 contained within the cartridge.

When the combustible fuel or power charge 60 is ignited, evolved gas under pressure is produced within the upper end of the upper cylinder portion 30a. This gaseous force acts downwardly upon an upper or floating piston 68 disposed initially adjacent the upper cylinder head 32. This piston carries suitable seal rings 69 in grooves 70 in its periphery engageable with the wall of the upper cylinder sleeve 31, to prevent leakage around the piston 68 in both directions.

Originally, the piston 68 rests upon a fluid medium 38 which substantially entirely fills the cylinder space between the upper piston 68 and the lower piston 39, including the volume of the passage 36 through the intermediate head. This fluid medium is predominantly and almost entirely a liquid, such as water, but the upper end 71 of the medium is preferably air, which forms an intermediate cushion between the floating piston 68 and the water 38 therebelow. In the event of an increase in the temperature of the intervening water, its expansion is permissible without operating the equipment in view of the presence of the air mass 71, which will merely be compressed to a certain extent.

For the purpose of delaying a transfer of the liquid medium 38 from the upper cylinder portion 30a into the lower cylinder portion 30b, as the floating piston 68 is forced downwardly by the gaseous pressure in the upper portion of the cylinder 30a, a flow restricting device 72, such as a bean or orifice, is threaded into the upper end of the passage 36 through the intermediate head 33. The cross-sectional area of the hole 73 through this bean or orifice 72 is much less than the area of the passage 36 itself, the orifice area being so chosen as to allow the fluid to flow from the upper cylinder portion 30a into the lower cylinder portion 30b at a slow or retarded rate, for a purpose to be explained below.

The apparatus is lowered in the well bore with the parts in the position shown in FIGS. 1a, 1b and 1c. When in this condition, the lower piston 39 is adjacent the intermediate cylinder head 33; while the upper or floating piston 68 is adjacent the upper cylinder head 32. The space between these pistons is substantially completely filled with water 38, or other suitable liquid, except for the small air space 71 on top of the liquid, which, as explained above, allows for thermal expansion and contraction of the liquid 38.

When the depth in the casing is reached at which the well packer A is to be set, the electrical circuit through the cartridge filament 67 is completed, which fires the cartridge 62. The flame issuing therefrom ignites the upper end of the combustible charge 60, initiating its combustion. This charge contains its own source of oxygen to support combustion. As combustion proceeds, a gaseous pressure is developed within the upper portion of the cylinder 30a above the floating piston 68. As the pressure increases, the floating piston 68 is urged downwardly and the cylinder 30 relatively upwardly. The force imposed on this floating piston is transmitted through the fluid medium 38 to the lower piston 39, and from this piston through the rod 42, cross-piece 43, and setting ring 53 to the sleeve 54, which bears against the upper slips 28. Downward movement of the lower piston 39 takes place against the relatively slight resistance of the air 75 in the lower cylinder portion 30b below the piston 39, which is initially at atmospheric pressure, and also against the hydrostatic head of fluid in the wall casing acting upwardly across the cross-sectional area of the piston rod 42. When sufficient pressure has been developed within the upper cylinder portion 30a by the gaseous medium, and has been transmitted through the floating piston 68, fluid medium 38, lower piston 39, piston rod 42, cross-piece 43, setting ring 53, and sleeve 54 to the slips 23, to overcome the shear strength of the shear screws 26, and also the hydrostatic head of fluid acting upwardly on the piston rod 42, the slips 23 are released from the expander 20 and are pushed downwardly along the latter into outward engagement with the casing B.

As the combustible charge 60 continues to burn, the gas pressure within the upper cylinder portion 30a increases to a further extent, and this increased pressure or force is transmitted to the lower piston 39 through the intervening fluid medium 38. Since the upper slips 23 are wedged against the casing B, the piston 39 cannot move downwardly to any further appreciable extent. Instead, the cylinder 30, actuating mandrel 47, sleeve 49, and packer body 10 are urged in an upward direction. When the pressure and force within the cylinder 30 has increased sufficiently to overcome the shear strength of the screws 24 holding the upper expander 20 to the body, such screws are disrupted and the packer body 10 is moved upwardly within the upper expander 20 to compress the rubber packer sleeve 19 between the upper and lower expanders 20, 18, forcing it into firm sealing engagement with the casing wall.

Further increase in the cylinder gas pressure, as a result of the continued combustion of the charge 60, effects shearing of the screws 25, 27 attaching the lower expander 18 to the body 10 and the lower slips 14 to the lower expander, allowing the cylinder 30 to move upwardly and carry the body 10 and lower slips 14 in an upward direction to shift the latter radially outward into engagement with the casing B.

The pressure in the cylinder 30 continues to increase, as combustion of the charge 60 proceeds, and all of the packer elements are engaged more firmly with the casing B. When the pressure exceeds the shear strength of the connector pin 48 securing the lower end of the actuating mandrel 47 to the sleeve 49, this pin is sheared to release automatically the setting tool C from the well packer A. All of the mechanism, with the exception of the packer A, may now be removed from the well casing B.

As was above indicated, a predetermined sequence of steps is preferred to insure proper setting of the well packer A in packed-off condition within the well casing. Thus, the screws 26 holding the upper slips 23 to the upper expander 20 are first sheared, to engage the upper slips with the casing B. Next, the screws 24 attaching the upper expander 20 to the body 10 are disrupted, to obtain expansion of the packing sleeve 19 against the casing. Thereafter, the screws 25 holding the lower expander 18 to the body 10 and the screws 27 holding the lower slips 14 to the lower expander are sheared, to obtain anchoring engagement of the lower slips with the casing wall. When all of this has occurred, the connector pin 48 is sheared, to obtain disconnection of the setting tool C from the well packer A.

It is preferred that a definite time interval elapse between each of the above-described operational sequences, to give the parts an opportunity to be shifted to their proper setting positions. The rate at which the combustion charge 60 burns may vary for different changes, and a pressure may be built up in the cylinder 30a above the floating piston 68 at an accelerated pace, which is greater than desired. This increase in pressure, however, is not transmitted directly to the lower piston 39, but indirectly through the intervening liquid medium 38, which must pass through the flow restricting orifice 72. Accordingly, relative downward movement of the lower piston 39 in the cylinder 30b proceeds at a slower rate than would be the case if the products of combustion acted directly upon the lower piston, since the only way in which the lower piston 39 can move relatively downward is through transferring of the intervening liquid 38 under pressure from the upper cylinder portion 30a, through the flow restricting orifice 72, to the lower cylinder portion 30b containing the lower piston 39.

Accordingly, downward movement of the floating piston 68 in the cylinder 30a is retarded, which is also true of the relative downward movement of the lower piston 39 in the cylinder 30b, which necessarily retards the rate at which the products of combustion can undertake an expansion in the upper cylinder portion 30a as its gaseous pressure increases. The operational sequences take place in a predetermined and ordered manner, to obtain shearing of the various screws at the proper time, and with sufficient time intervals between their disruptions to insure shifting of the parts of the apparatus to their proper operational positions.

At the time that the connector pin 48 is sheared, to release the setting tool C from the well packer A, the lower piston 39 has not been moved downwardly to its fullest extent within the lower cylinder sleeve 34. Shearing of the pin 48 releases the load on the lower piston 39. If the gas under pressure in the cylinder were acting directly upon the lower piston, it would partake of a sudden expansion, upon release of the load, to shift the lower piston relatively downward almost instantaneously to the extent limited by its engagement with the lower cylinder head 35. This sudden expansion and movement would cause the piston 39 to strike a tremendous blow on the lower cylinder head 35, since the device is operable at comparatively high unit pressures, the reaction of the blow and the sudden movement of the cylinder 30 and piston 39 introducing a recoil, or shock load, on all of the equipment in the well bore, which might result in damge to some of its parts.

However, in the form of invention illustrated in the drawings, the gaseous pressure medium does not act directly upon the lower piston 39, but urges the latter relatively downward through the intervening fluid or liquid medium 38. When the connector pin 48 is sheared, the load on the cylinder 30 and lower piston 39 is released suddenly, but such sudden release almost immediately causes relative downward movemen of the lower piston 39 in the cylinder 30b to a slight extent, which relieves the liquid 38 between the lower piston 39 and the orifice 72 of substantially all pressure, and removes any forces on the lower piston 39 seeking to drive it relatively downward in the cylinder at a high rate of speed. Instead, the lower piston 39 is caused to move through the lower cylinder portion 30b in a downward direction at a relatively low rate, inasmuch as release of the load on the equipment still results in a gradual lowering of the floating piston 68 in the cylinder 30a, and a gradual expansion of the gaseous medium thereabove. Such gradual lowering can only occur since the floating piston 68 must force the liquid in the upper cylinder portion 30a through the flow restricting orifice 72. The flow through the orifice can only take place at a relatively slow rate because of the comparatively small cross-sectional area of its bore 73. As a consequence of restricting or retarding the flowing of the intervening liquid 38 through the orifice, the lower piston 39 is moved downwardly relatively to the cylinder 30 in a gradual manner, until it comes to rest against the lower cylinder head 35, without striking any sharp blows on the latter.

The inventor claims:

1. In well apparatus: a well device having a body and slips for anchoring said body in a well bore; fluid actuated means for setting said device in said well bore comprising a lower cylinder, releasable means connecting said lower cylinder to said [lower] body, a lower piston means in said lower cylinder operatively engaging said slips, an upper cylinder secured to said lower cylinder, an upper piston in said upper cylinder, means providing a fluid passage between said cylinders for an intervening fluid medium adapted to be contained in both cylinders and passage, said passage having a flow restricting choke orifice, means supplying a gas under pressure in said upper cylinder to shift said upper piston relatively downward in said upper cylinder and cause said upper piston to force the fluid medium in said upper cylinder through said choke orifice into said lower cylinder to shift said lower piston means relatively downward in said lower cylinder to anchor said slips and cause said lower cylinder to thereafter move upwardly and correspondingly move said body upwardly, said releasable means being released when a predetermined force is exerted by said lower cylinder on said body, the area of the passage through said choke orifice being comparatively small to greatly retard the rate at which the fluid medium in said upper cylinder can be forced into said lower cylinder.

2. In well apparatus: a well tool having a body and slips for anchoring said body in a well bore; fluid actuated means for setting said tool in said well bore comprising a lower cylinder device, a lower piston device in said lower cylinder device, one of said devices operatively engaging said slips, means releasably connecting the other of said devices to said body, an upper cylinder secured to one of said lower devices, an upper piston in said upper cylinder, means providing a fluid passage between said upper cylinder and lower cylinder device for an intervening fluid medium adapted to be contained in said upper cylinder, cylinder device and passage, said passage having a flow restricting choke orifice, means supplying a gas under pressure in said upper cylinder to shift said upper piston relatively downward in said upper cylinder and cause said upper piston to force the fluid medium in said upper cylinder through said choke orifice into said lower cylinder device to shift said one of said devices relatively downward of the other of said devices to anchor said slips and cause said other of said devices to thereafter move upwardly and correspondingly move said body upwardly, said releasable means being released when a predetermined force is exerted by said other of said [device] *devices* on said body, the area of the passage through said choke orifice being comparatively small to greatly retard the rate at which the fluid medium in said upper cylinder can be forced into said lower cylinder device.

3. In well apparatus: a well tool having a body and slips for anchoring said body in a well bore; fluid actuated means for setting said tool in said well bore comprising a lower cylinder device, a lower piston device in said lower clyinder device [, one of said devices] operatively engaging said slips, means releasably connecting [the other of said devices] *said cylinder device* to said body, an upper cylinder secured to [one of said lower devices] *said cylinder device*, an upper piston in said upper cylinder, means providing a fluid passage between said upper cylinder and *the upper portion of said* lower cylinder device for an intervening fluid medium adapted to be contained in said upper cylinder, cylinder device and passage, said passage having a flow restricting choke orifice, means supplying a fluid under pressure in said upper cylinder to shift said upper piston relatively in said upper cylinder and cause said upper piston to force the fluid medium in said upper cylinder through said choke orifice into *the upper portion of* said lower cylinder device to shift said [one of said devices] *lower piston device* relatively downward of [the other of said devices] *said lower cylinder device* to anchor said slips and cause said [other of said devices] *lower cylinder device* to thereafter move upwardly and correspondingly move said body upwardly, said releasable means being released when said [other of said devices] *lower cylinder device* has moved said body to a predetermined degree, the area of the passage through said choke orifice being comparatively small to greatly retard the rate at which the fluid medium in said upper cylinder can be forced into said lower cylinder device.

4. In well apparatus: a well tool having a body and normally retracted means on said body; fluid actuated means for setting said tool in said well bore comprising a lower cylinder, releasable means connecting said lower cylinder to said body, a lower piston means in said lower cylinder operatively engaging said normally retracted means, an upper cylinder secured to said lower cylinder, an upper piston in said upper cylinder, means providing a fluid passage between said cylinders for an intervening fluid medium adapted to be contained in both cylinders and passage, said passage having a flow restricting choke orifice, means supplying a gas under pressure in said upper cylinder to shift said upper piston relatively downward in said upper cylinder and cause said upper piston to force the fluid medium in said upper cylinder through said choke orifice into said lower cylinder to shift said lower piston means relatively downward in said lower cylinder to expand said normally retracted means and cause said lower cylinder to thereafter move upwardly and correspondingly move said body upwardly, said releasable means being released when a predetermined force is exerted by said lower cylinder on said body, the area of the passage through said choke orifice being comparatively small to greatly retard the rate at which the fluid medium in said upper cylinder can be forced into said lower cylinder.

5. In well apparatus: a well tool having a body and normally retracted means on said body; fluid actuated means for setting said tool in said well bore comprising a lower cylinder device, a lower piston device in said lower cylinder device, one of said devices operatively engaging said normally retracted means, means releasably connecting the other of said devices to said body, an upper cylinder secured to one of said lower devices, an upper piston in said upper cylinder, means providing a fluid passage between said upper cylinder and lower cylinder device for an intervening fluid medium adapted to be contained in said upper cylinder, cylinder device and passage, said passage having a flow restricting choke orifice, means supplying a gas under pressure in said upper cylinder to shift said upper piston relatively downward in said upper cylinder and cause said upper piston to force the fluid medium in said upper cylinder through said choke orifice into said lower cylinder device to shift said one of said devices relatively downward of the other of said devices to expand said normally retracted means and cause said other of said devices to thereafter move upwardly and correspondingly move said body upwardly, said releasable means being released when a predetermined force is exerted by said other of said devices on said body, the area of the passage through said choke orifice being comparatively small to greatly retard the rate at which the fluid medium in said upper cylinder can be forced into said lower cylinder device.

6. In well apparatus: a well tool having a body and normally retracted means on said body; fluid actuated means for setting said tool in said well bore comprising a lower cylinder device, a lower piston device in said lower cylinder device [, one of said devices] operatively engaging said normally retracted means, means releasably connecting [the other of said devices] *said cylinder device* to said body, an upper cylinder, an upper piston in said upper cylinder, means providing a fluid passage between said upper cylinder and *the upper portion of said* lower cylinder device for an intervening fluid medium adapted to be contained in said upper cylinder, cylinder device and passage, said passage having a flow restricting choke orifice, means supplying a fluid under pressure in said upper cylinder to shift said upper piston relatively in said upper cylinder and cause said upper piston to force the fluid medium in said upper cylinder through said choke orifice into *the upper portion of* said lower cylinder device to shift said [one of said devices] *lower piston device* relatively [in the direction with respect to the other of said devices] *downwardly of said lower cylinder device* to expand said normally retracted means and cause said [other of said devices] *lower cylinder device* to thereafter move relatively [in the opposite direction] *upwardly* and correspondingly move said body [in said opposite direction] *upwardly*, said releasable means being released when said [other of said devices] *lower cylinder device* has moved said body to a predetermined degree, the area of the passage through said choke orifice being comparatively small to greatly retard the rate at which the fluid medium in said upper cylinder can be forced into said lower cylinder device.

7. In well apparatus: a well tool having a body member and a normally retracted member on said body member; fluid actuated means for setting said tool in said well bore comprising a lower cylinder device, a lower piston device in said lower cylinder device, one of said devices operatively engaging said normally retracted member and the other of said devices operatively engaging said body member, means releasably connecting one device to one of said members, an upper cylinder, an upper piston in said upper cylinder, means providing a fluid passage between said upper cylinder and *the upper portion of said* lower cylinder device for an intervening fluid medium adapted to be contained in said upper cylinder, cylinder device and passage, said passage having a flow restricting choke orifice, means supplying a fluid under pressure in said upper cylinder to shift said upper piston relatively in said upper cylinder and cause said upper piston to force the fluid medium in said upper cylinder through said choke orifice into *the upper portion of* said lower cylinder device to shift said one of said devices in one longitudinal direction with respect to the other of said devices to expand said normally retracted member and cause said other of said devices to thereafter move in the opposite longitudinal direction and correspondingly move said body member in said opposite longitudinal direction, said releasable means being released when said other of said devices has moved one of said members to a predetermined degree, the area of the passage through said choke orifice being comparatively small to greatly retard the rate at which the fluid medium in said upper cylinder can be forced into said lower cylinder device.

*8. In well apparatus: a well tool having a body and slips for anchoring said body in a well bore; fluid actuated means for setting said tool in said well bore comprising a lower cylinder device, a lower piston device in said lower cylinder device operatively engaging said slips, means releasably connecting the cylinder device to said body, an upper cylinder, an upper piston in said upper cylinder, a head interconnecting said upper cylinder and lower cylinder device and having a passage therethrough opening into said upper cylinder and also opening into the upper end of said lower cylinder device, said upper cylinder below said upper piston, said passage and said lower cylinder device above said lower piston device being adapted to contain an intervening fluid medium, said passage having a flow restricting choke orifice, means supplying a fluid under pressure in said upper cylinder to shift said upper piston downwardly in said upper cylinder and cause said upper piston to force the fluid medium in said upper cylinder through said choke orifice into said lower cylinder device above said lower piston device to shift said lower piston device relatively downwardly of said lower cylinder device to anchor said slips and cause said lower cylinder device to thereafter move upwardly and correspondingly move said body upwardly, said releasable means being released when said lower cylinder device has moved said body to a predetermined degree, the area of the passage through said choke orifice being comparatively small to greatly retard the rate at which the fluid medium in said upper cylinder can be forced into said lower cylinder device.*

*9. In well apparatus: a well tool having a body and normally retracted means on said body; fluid actuated means for setting said tool in said well bore comprising a lower cylinder device, a lower piston device in said lower cylinder device operatively engaging said normally retracted means, means releasably connecting said cylinder device to said body, an upper cylinder, an upper piston in said upper cylinder, a head interconnecting said upper cylinder and lower cylinder device and having a passage opening into said upper cylinder and also opening into the upper end of said lower cylinder device, said upper cylinder below said upper piston, said passage, and said cylinder device above said lower piston device being adapted to contain an intervening fluid medium, said passage having a flow restricting choke orifice, means supplying a fluid under pressure in said upper cylinder to shift said upper piston downwardly in said upper cylinder and cause said upper piston to force the fluid medium in said upper cylinder through said choke orifice into said lower cylinder device to shift said lower piston device downwardly in said lower cylinder device to expand said normally retracted means and cause said lower cylinder device to thereafter move upwardly and correspondingly move said body upwardly, said releasable means being released when said lower cylinder device has moved said body to a predetermined degree, the area of the passage through said choke orifice being comparatively small to greatly retard the rate at which the fluid medium in said upper cylinder can be forced into the upper portion of said lower cylinder device.*

References Cited in the file of this patent or the original patent

UNITED STATES PATENTS

| | | |
|---|---|---|
| 2,093,486 | Schoepf et al. | Sept. 21, 1937 |
| 2,373,006 | Baker | Apr. 3, 1945 |
| 2,381,929 | Schlumberger | Aug. 14, 1945 |

OTHER REFERENCES

Composite Catalog of Oil Field and Pipe Line Equipment, 1946–47 edition, p. 2022.